June 3, 1958     H. A. CASHMAN     2,836,988
ADJUSTABLE STEERING MECHANISM
Filed March 12, 1954
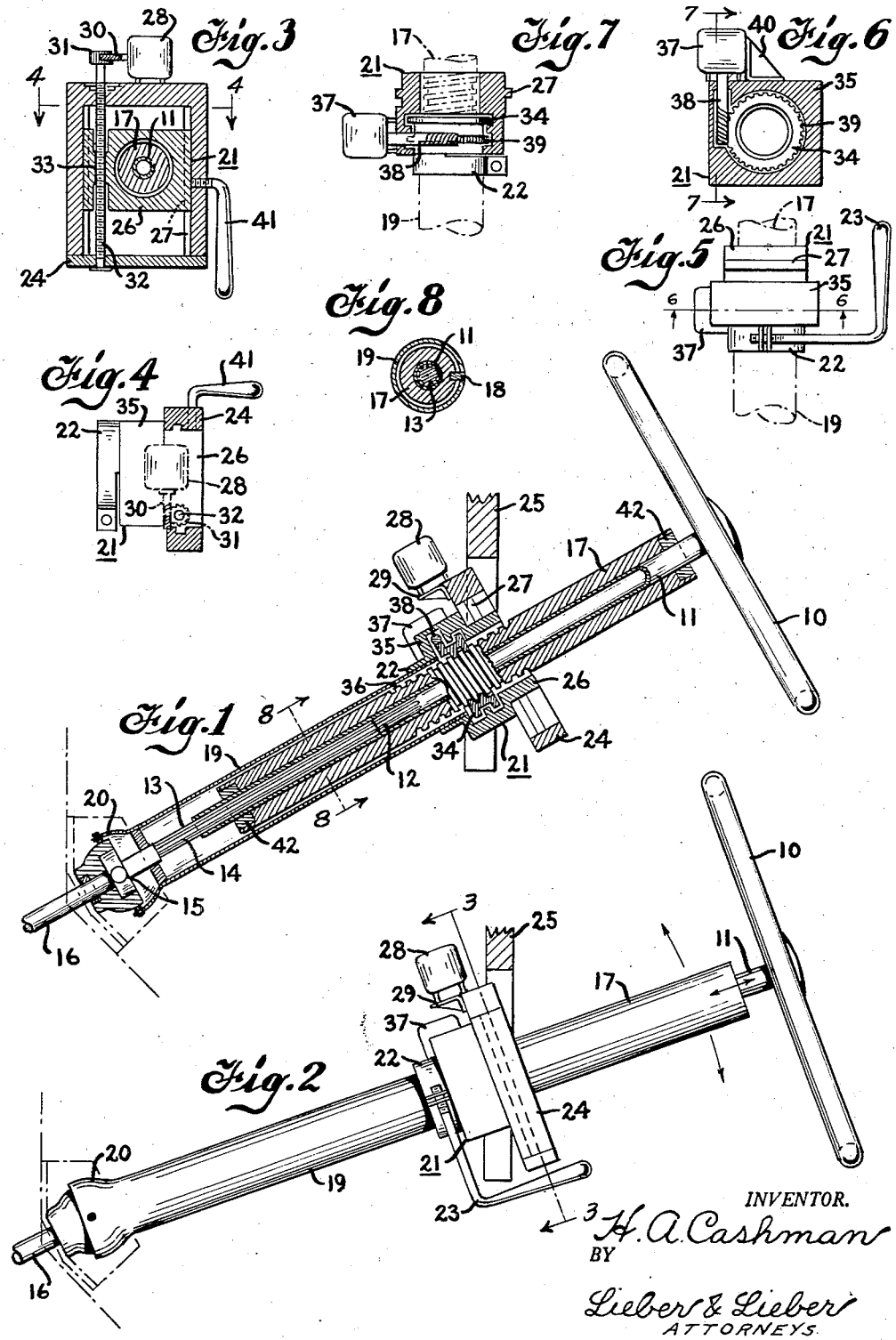
INVENTOR.
H. A. Cashman
BY
Lieber & Lieber
ATTORNEYS United States Patent Office 2,836,988
Patented June 3, 1958

2,836,988

ADJUSTABLE STEERING MECHANISM

Howard A. Cashman, Appleton, Wis.

Application March 12, 1954, Serial No. 415,734

2 Claims. (Cl. 74—493)

The present invention relates generally to improvements in art of steering vehicles, and relates more particularly to the provision of an improved universally adjustable steering mechanism.

A primary object of the present invention is to provide an improved adjustable vehicle steering apparatus which is simple and compact in construction and which is moreover highly efficient and practical in operation.

Various steering arrangements for automobiles and the like wherein the steering wheel and its supporting column are adjustable for the comfort and convenience of the driver have heretofore been proposed. However, these prior adjustable steering devices have never enjoyed any appreciable commercial success and have never been adopted on standard lines of vehicles for one or more of the following reasons. In some instances, the proposed devices permitted only angular adjustment of the steering column and in others only longitudinal adjustment thereof. Furthermore, the prior arrangements were for the most part either too complicated and expensive to warrant the application thereof to the average automobile or they were too unstable and flimsy to withstand average usage over a satisfactory period of time. In addition, the operating mechanisms of most of the previous assemblages objectionably impaired the interior appearance of the vehicle as well as interfering with the operation thereof, and many exposed working parts would be subject to excessive dirt, grit and tampering which required frequent cleaning and readjustment.

It is therefore a more specific object of this invention to provide an improved universally adjustable steering assemblage for vehicles which obviates all of the objections and disadvantages of prior devices of this general type.

Another specific object of the invention is to provide a new and improved steering assemblage in which the steering wheel and its supporting column are both angularly and longitudinally adjustable to a maximum extent at the will of the operator.

Another specific object of my invention is to provide an improved motor operated adjustable steering apparatus consisting of relatively few working parts which are all effectively housed for utmost protection but which are nevertheless readily accessible when desired for inspection, replacement or repair.

Still another specific object of this invention is to provide a new and useful improved steering assemblage which may be readily applied to new or existing vehicles at relatively low cost and in which the actuating mechanisms for effecting the desired angular and longitudinal adjustments are compactly located and housed immediately behind the vehicle dashboard and entirely out of the operator's way.

A further specific object of my present invention is to provide an improved adjustable steering assemblage for vehicles which is exceptionally durable and by means of which the vehicle may be steered without interference at any desired position of adjustment of the improved apparatus, the operating mechanism being housed in a most compact and unitary manner.

An additional specific object of the present invention is to provide an improved steering device comprising, a telescopic shaft having a universal motion transmitting connection with the motion delivery steering post of a vehicle, a steering wheel secured to the upper end of the telescopic shaft, means for supporting the telescopic member and including a frame mounted on the vehicle dashboard and having a guide slot and an element slidably confined within the slot and embracing the telescopic member, means for moving the element along the slot to effect lateral adjustments of the steering wheel, and means associated with the telescopic member for independently effecting longitudinal adjustments.

These and other specific objects and advantages of the present invention will become apparent from the following detailed description.

A clear conception of the several features constituting my present improvement and of the mode of constructing and of utilizing typical apparatus embodying the invention may be had by referring to the drawing accompanying and forming a part of this specification, wherein like reference characters designate the same or similar parts in the various views.

Fig. 1 is a transverse section through a typical adjustable vehicle steering assemblage embodying the invention and showing the same associated with a fragment of the vehicle motion delivery post and dashboard;

Fig. 2 is a side view of the same assemblage showing the steering wheel in a somewhat different position of lateral and longitudinal adjustment;

Fig. 3 is a transverse section through the portion of the adjusting mechanism for effecting lateral or angular adjustments, the section being taken along the line 3—3 of Fig. 2;

Fig. 4 is a transverse section through the same mechanism taken along the line 4—4 of Fig. 3;

Fig. 5 is a side view of the housing for the mechanism for effecting longitudinal or axial adjustments;

Fig. 6 is a transverse section through the housing taken along the line 6—6 of Fig. 5;

Fig. 7 is another transverse section through the housing taken along the line 7—7 of Fig. 6; and Fig. 8 is a transverse section through the steering column taken along the line 8—8 of Fig. 1.

While the improved device has been particularly shown and described herein as being especially adapted for use in steering automobiles and as comprising a particular arrangement and association of parts, it is not desired or intended to thereby unnecessarily limit the invention; and it is contemplated that certain specific descriptive terms used herein shall be given the broadest possible interpretation consistent with the disclosure.

Referring to the drawing, the improved adjustable steering mechanism shown therein as embodying the invention comprises, in general, a steering wheel 10 secured in any convenient manner to the upper end of a tubular steering shaft 11 splined as at 12 and slidably but drivingly embracing a steering shaft 13 correspondingly splined as at 14, the shaft 13 having a lower universal motion transmitting connection 15 with the usual motion delivery post 16 of the vehicle; a sleeve 17 embracing the tubular member 11 in a manner permitting rotation of the member 11 relative to and within the sleeve 17 while preventing relative longitudinal movement therebetween; a tubular protective housing 19 surrounding the sleeve 17 and terminating at its lower end in a bell housing 20 for protectively confining the universal joint 15 the housing 19 being keyed as at 18 to the sleeve 17 to prevent relative rotation thereof while permitting longitudinal movement of the sleeve therein; a housing 21 secured to the tubular housing 19 as by means of a split ring portion 22 and locking screw 23; a stationary frame 24 suitably secured to the vehicle dashboard 25 within a cut-out portion thereof, the frame 24 having a guide slot therein adapted to slidably receive the upper reduced portion 26 of the housing 21, the portion 26 being guided within the slot of the frame 24 as by means of a tongue and groove arrangement 27; means such as a reversible motor 28 suitably mounted on the stationary frame 24 as by means of a bracket 29 and being connected to the reduced housing portion 26 through a drive arrangement including the motor shaft 30 meshing with a gear 31 carried by a shaft 32 having screw threaded engagement with a reduced portion 33 of the housing 26 as shown more clearly in Fig. 3; a rotatable driving member or internally threaded ring or collar 34 rotatably confined within the larger portion 35 of the housing 21 and having screw threaded engagement with external screw thread 36 on the sleeve 17, the member 34 being driven by suitable means such as a reversible motor 37 through the threaded shaft 38 thereof drivingly coacting with a threaded portion 39 of the member 34 which in turn is retained against lateral displacement within portion 35 of the housing 21 so as to cause longitudinal movement of the sleeve 17 and its associated shaft 11 upon rotation of the member 34 by the motor 37 which may be conveniently mounted on the portion 35 of the housing 21 by means of a bracket 40 or the like.

In actual commercial practice, it is, of course, necessary to either externally thread the sleeve 17 all of the way to its lower end or to split the internally threaded ring or collar member 34 in order to enable application of this member to the sleeve. Similarly, it is necessary to provide means for applying the housing 21 about the member 34, and to accomplish this, the housing 21 may be split in any suitable manner. The various parts may be fabricated of any suitable materials, and suitable bearings 42 may be provided for facilitating rotation of the tubular member 11 within the sleeve 17. It is important to note that the shaft 13 and the tubular member 11 form a telescopic member in which the parts are longitudinally but non-rotatably movable relative to each other, and the frame 24 is preferably pivotally secured to the dashboard 25 in such a manner as to permit slight rocking thereof while preventing axial displacement of the housing 21 and the ring member 34 journalled therein. When it is desired to effect angular adjustments in the steering column and consequent lateral adjustments of the wheel 10 as indicated by the arrows in Fig. 2, it is only necessary to start the motor 28 in the desired direction, the motion from the motor shaft 30 then being transmitted to the shaft 32 to cause shifting of the housing 21 in the proper direction until the adjustment is effected and the motor turned off; and although it is believed to be unnecessary, a locking screw 41 may be provided in the frame 24 for positively locking the housing 21 in its adjusted position within the slot of the frame. To effect longitudinal or axial adjustments, it is only necessary to start the motor 37 in either a forward or reverse direction as desired, the motor shaft 38 then acting to drive the ring 34 either clockwise or counterclockwise within the confines of the housing 21 to thereby cause longitudinal movement of the sleeve 17 and tubular member 11 by reason of the screw threaded or worm gear coaction of the sleeve with the ring until the proper adjustment has been completed and the motor 37 turned off.

From the foregoing detailed description, it is believed apparent that I have provided an improved universally adjustable vehicle steering assemblage which is simple and durable in construction as well as practical and efficient in use. All working parts of the improved device are effectively housed in a compact manner, and none of the assemblage interferes with the operation of the vehicle or with the drive, the parts likewise being housed in such a manner as not to detract from the aesthetic appearance of the vehicle. Furthermore, the improved device may obviously be readily applied either to existing or to new vehicles, and all of the parts are protected against tampering while being easily accessible whenever necessary. All adjustments may likewise be readily effected by a novice, and to prevent overrun of the motors 28, 37, suitable clutch means may be provided, this being a matter within the province of those skilled in the art. It is believed apparent that the improved device does not in any way interfere with the manipulation of the steering apparatus of the vehicle, and the comfort of the driver may be enhanced to a maximum through use of the device.

It should be understood that it is not desired or intended to limit this invention to the exact details of construction or to the precise mode of use herein shown and described, since various modifications within the scope of the appended claims may occur to those skilled in the art to which this invention pertains.

I claim:

1. In a vehicle steering device cooperable with the steering motion delivery post and dashboard of a vehicle, an upwardly projecting shaft having its lower end drivingly connected by a universal joint to the upper end of the steering post, a tubular shaft member telescopically embracing the upper portion of said shaft and having a spline driving connection therewith permitting displacement of the member axially of the shaft, a steering wheel secured to the upper end of said member and being operable to transmit steering rotation to said post through said member and said shaft, an elongated sleeve embracing and providing a bearing for said member and having its medial portion externally screw threaded, a frame mountable upon the vehicle dashboard and having a guide slot disposed transversely of said sleeve and surrounding the latter near said medial threaded portion, a housing fixed against rotation but slidable within said frame slot and loosely embracing said threaded sleeve portion and having a tubular lower extension enclosing the lower portion of said sleeve and protruding lower portions of said member and of said shaft, a ring journalled within said housing and having internal screw threads coacting with the externally threaded portion of said sleeve, means interposed between said frame and housing and being operable to move the latter along said guide slot to effect lateral adjustment of the steering wheel in either direction, and other means interposed between said housing and ring and being operable to move said sleeve and said member axially and to thereby effect axial adjustment of the steering wheel in either direction.

2. In a vehicle steering device cooperable with the steering motion delivery post and dashboard of a vehicle, an upwardly projecting shaft having its lower end drivingly connected by a universal joint to the upper end of the steering post, a tubular shaft member telescopically embracing the upper portion of said shaft and having a spline driving connection therewith permitting displacement of the member axially of the shaft, a steering wheel secured to the upper end of said member and being operable to transmit steering rotation to said post through said member and said shaft, an elongated sleeve embracing and providing a bearing for said member and having its medial portion externally screw threaded, a frame mountable upon the vehicle dashboard and having a guide slot disposed transversely of said sleeve and surrounding the latter near said medial threaded portion, a housing fixed against rotation but slidable within said frame slot and loosely embracing said threaded sleeve portion and having a tubular lower extension enclosing the lower portion of said sleeve and protruding lower portions of said member and of said shaft, a ring journalled within said housing and having internal screw threads coacting with the externally threaded portion of said sleeve, a reversible electric motor carried by said frame and being operably connected to said housing to move the latter along said guide slot to effect lateral adjustment of the steering wheel in either direction, means for locking said housing to said frame in various positions of adjustment, and another reversible electric motor carried by said housing and being operably connected to said ring to move said sleeve and said member axially and to thereby effect axial adjustment of the steering wheel in either direction.

References Cited in the file of this patent

UNITED STATES PATENTS

| | | |
|---|---|---|
| 1,619,980 | Kelsey | Mar. 8, 1927 |
| 1,710,399 | Banning | Apr. 23, 1929 |
| 2,464,856 | Finley | Mar. 22, 1949 |

FOREIGN PATENTS

| | | |
|---|---|---|
| 734,904 | France | Aug. 9, 1932 |